US 8,599,824 B2

(12) United States Patent
Walley et al.

(10) Patent No.: US 8,599,824 B2
(45) Date of Patent: Dec. 3, 2013

(54) METHOD AND SYSTEM FOR BLUETOOTH CONDITIONAL SYNCHRONIZATION

(75) Inventors: John Walley, Ladera Ranch, CA (US); Norbert Grunert, Juan-les-Pins (FR)

(73) Assignee: Broadcom Corporation, Irvine, CA (US)

( * ) Notice: Subject to any disclaimer, the term of this patent is extended or adjusted under 35 U.S.C. 154(b) by 963 days.

(21) Appl. No.: 12/013,171

(22) Filed: Jan. 11, 2008

(65) Prior Publication Data
US 2009/0180464 A1 Jul. 16, 2009

(51) Int. Cl.
H04J 3/06 (2006.01)

(52) U.S. Cl.
USPC .......................................... 370/350; 375/354

(58) Field of Classification Search
None
See application file for complete search history.

(56) References Cited

U.S. PATENT DOCUMENTS

| | | | | |
|---|---|---|---|---|
| 5,835,165 A * | 11/1998 | Keate et al. | .............. | 375/240.27 |
| 5,881,105 A * | 3/1999 | Balachandran et al. | ...... | 375/259 |
| 5,905,762 A * | 5/1999 | Stephens | ........................ | 375/326 |
| 5,917,852 A * | 6/1999 | Butterfield et al. | ........... | 375/141 |
| 5,937,016 A * | 8/1999 | Choi | ............................... | 375/341 |
| 6,157,683 A * | 12/2000 | Daribi et al. | .................. | 375/341 |
| 6,158,041 A * | 12/2000 | Raleigh et al. | ................. | 714/792 |
| 6,205,187 B1 * | 3/2001 | Westfall | ........................ | 375/341 |
| 6,233,712 B1 * | 5/2001 | Rhee et al. | ..................... | 714/789 |
| 6,424,673 B1 * | 7/2002 | Chen et al. | ..................... | 375/149 |
| 6,625,179 B1 * | 9/2003 | Doetsch et al. | ................ | 370/529 |
| 6,714,774 B1 * | 3/2004 | Nafie et al. | ..................... | 455/273 |
| 6,728,218 B1 * | 4/2004 | Corke et al. | ................... | 370/252 |
| 7,113,782 B2 * | 9/2006 | Lucidarme | ................ | 455/432.1 |
| 7,127,443 B2 * | 10/2006 | Gueguen et al. | ...................... | 1/1 |
| 7,353,369 B1 * | 4/2008 | Coon et al. | .................... | 712/234 |
| 7,380,193 B1 * | 5/2008 | Shalvi | .......................... | 714/746 |
| 7,724,699 B2 * | 5/2010 | Baey et al. | .................... | 370/328 |
| 8,094,597 B1 * | 1/2012 | Chhabra et al. | ................ | 370/311 |
| 2001/0021236 A1 * | 9/2001 | Song | .............................. | 375/366 |
| 2002/0041566 A1 * | 4/2002 | Yang et al. | ..................... | 370/229 |
| 2002/0051501 A1 * | 5/2002 | Demjanenko et al. | ......... | 375/298 |
| 2002/0057664 A1 * | 5/2002 | Sarkar | ........................... | 370/342 |
| 2002/0067784 A1 * | 6/2002 | Bowler | .......................... | 375/354 |
| 2003/0066008 A1 * | 4/2003 | Kikuchi et al. | ............... | 714/752 |
| 2003/0069560 A1 * | 4/2003 | Adamis et al. | ................ | 604/521 |
| 2003/0101402 A1 * | 5/2003 | Amrani et al. | ................ | 714/755 |
| 2003/0112784 A1 * | 6/2003 | Lohtia et al. | .................... | 370/342 |
| 2003/0113013 A1 * | 6/2003 | Hammadou | .................. | 382/166 |
| 2003/0126551 A1 * | 7/2003 | Mantha et al. | ................. | 714/790 |
| 2004/0081265 A1 * | 4/2004 | Amano | .......................... | 375/355 |
| 2004/0137849 A1 * | 7/2004 | Kloper et al. | .............. | 455/67.11 |
| 2004/0165673 A1 * | 8/2004 | Belaiche | ......................... | 375/259 |
| 2004/0187069 A1 * | 9/2004 | Pietraski et al. | .............. | 714/786 |
| 2004/0202203 A1 * | 10/2004 | Kolze et al. | .................... | 370/503 |

(Continued)

*Primary Examiner* — Bunjob Jaroenchonwanit
(74) *Attorney, Agent, or Firm* — Thomas|Horstemeyer, LLP.

(57) ABSTRACT

Aspects of a method and system for Bluetooth conditional synchronization are provided. In this regard, a synchronization code of a piconet may be included in each transmitted Bluetooth packets and a portion of the received synchronization code may be used for a synchronization process. The received synchronization code may be selectively sampled at a Bluetooth device. The Bluetooth device may determine a puncturing pattern to detect selected samples in the received synchronization code. The punctured received synchronization code may correlate to a reference code derived from a Bluetooth device address of the master device. The correlation value may be compared to a predetermined threshold value to indicate a success or a failure of the synchronization process. The threshold value as well as the puncture pattern may be user specific or centrally controlled, and they may be programmed or updated dynamically based on various conditions.

26 Claims, 4 Drawing Sheets

(56) References Cited

U.S. PATENT DOCUMENTS

| | | | |
|---|---|---|---|
| 2004/0264431 A1* | 12/2004 | Rhodes | 370/343 |
| 2005/0169166 A1* | 8/2005 | Okada et al. | 370/208 |
| 2005/0172202 A1* | 8/2005 | Eroz et al. | 714/755 |
| 2005/0195769 A1* | 9/2005 | Kaewell et al. | 370/335 |
| 2005/0215196 A1* | 9/2005 | Krishnan et al. | 455/41.2 |
| 2005/0237966 A1* | 10/2005 | Aiello et al. | 370/321 |
| 2005/0276313 A1* | 12/2005 | Horneman et al. | 375/148 |
| 2005/0283710 A1* | 12/2005 | Olivieri | 714/759 |
| 2006/0002405 A1* | 1/2006 | Le Sauze et al. | 370/401 |
| 2006/0007953 A1* | 1/2006 | Vesma et al. | 370/466 |
| 2006/0035654 A1* | 2/2006 | Lee et al. | 455/502 |
| 2006/0274845 A1* | 12/2006 | Chiang et al. | 375/261 |
| 2007/0091844 A1* | 4/2007 | Huang et al. | 370/331 |
| 2007/0216551 A1* | 9/2007 | Yuan et al. | 341/58 |
| 2008/0072124 A1* | 3/2008 | Chiou | 714/790 |
| 2008/0125037 A1* | 5/2008 | Ibrahim et al. | 455/41.2 |
| 2008/0201628 A1* | 8/2008 | Liou et al. | 714/786 |
| 2008/0219281 A1* | 9/2008 | Akin et al. | 370/419 |
| 2008/0285491 A1* | 11/2008 | Parkvall et al. | 370/310 |
| 2009/0076352 A1* | 3/2009 | Fujita et al. | 600/302 |
| 2009/0080566 A1* | 3/2009 | Tong et al. | 375/299 |
| 2009/0086711 A1* | 4/2009 | Capretta et al. | 370/350 |
| 2009/0268660 A1* | 10/2009 | Agarwal | 370/316 |
| 2010/0166051 A1* | 7/2010 | Chung et al. | 375/225 |
| 2011/0044256 A1* | 2/2011 | Chang et al. | 370/329 |

* cited by examiner

METHOD AND SYSTEM FOR BLUETOOTH CONDITIONAL SYNCHRONIZATION

CROSS-REFERENCE TO RELATED APPLICATIONS/INCORPORATION BY REFERENCE

Not Applicable.

FIELD OF THE INVENTION

Certain embodiments of the invention relate to wireless communication. More specifically, certain embodiments of the invention relate to a method and system for Bluetooth conditional synchronization.

BACKGROUND OF THE INVENTION

Bluetooth is an emerging standard with peer-to-peer short-range wireless technology (a cable replacement technology). Bluetooth is considered as a secure short-range wireless network to intend to provide pervasive connectivity, especially between portable devices like mobile computers, mobile phones, and other nomadic devices. Bluetooth radios operate in the unlicensed ISM band at 2.4 GHz with a set of 79 hop carriers with 1 MHz spacing. A sophisticated transmission model is adopted in the Bluetooth specification to ensure protection from interference and security of data. A frequency hopping spread spectrum technology is applied at the channel level. A slotted channel model is utilized with nominal slot length of 625 μs. For full duplex transmission, the Time-Division Duplex (TDD) scheme is employed.

A collection of Bluetooth devices may be connected in an Ad Hoc fashion. The Bluetooth devices may connect to each other to form a network known as a piconet. A device in the piconet may be enabled to operate a master or a slave on a per connection basis. A master may be a device that initiates communication over a piconet channel, while a slave may be a device that responds to the master for the duration of the piconet connection. A master may control and determine aspects of activities in the piconet. The master and the slave may alternatively transmit packets via time slots.

A piconet channel may be represented by a pseudo-random hopping sequence hopping through 79 RF channels. The hopping sequence is unique for the piconet and is determined by the Bluetooth device address of the master. The channel is divided into time slots where each slot corresponds to an RF hop frequency. The RF hop frequency remains fixed for the duration of a packet. Consecutive hops correspond to different RF hop frequencies. The nominal hop rate is 1600 hops/s. With regard to channel linkup, information in piconet is encoded in packets. Each packet is transmitted on a different hop frequency. A packet normally covers a single slot, but may be extended to cover up to five slots.

Each data packet may be transmitted independently by modulating an electrical or electromagnetic (radio or optical) signal in accordance with the packet's contents and transmitting the signal via the relevant communications medium to a receiver. Boundaries between successive packets in a symbol stream may be defined in various ways, such as by providing a fixed pattern of symbols to identify the start or end of a packet. A device receiving a transmitted signal may establish synchronization with a received signal before decoding the information in the received signal to recover transmitted bit patterns. For a Bluetooth enabled device, packets of information may be exchanged between Bluetooth enabled devices using TDD with alternating transmissions, and the basic signal recovering process involves waveform demodulation, dc compensation, bit synchronization and bit detection. Waveform demodulation usually is implemented in a Bluetooth radio module and dc compensation may be implemented either in the Bluetooth radio module or in the Bluetooth baseband. Bit synchronization and detection may be implemented in the Bluetooth baseband. Bit synchronization may be a critical process for achieving correct bit detection. In Bluetooth specification, a synchronization code is embedded in each Bluetooth packet to assist receive timing synchronization process for each packet received by the recipient.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method is provided for Bluetooth conditional synchronization, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for Bluetooth conditional synchronization. Various aspects of the invention may provide a Bluetooth conditional synchronization in which a portion of a synchronization code embedded in a piconet packet may be used for a synchronization process. For example, a synchronization code in a received piconet packet may be punctured and the punctured version of the synchronization code may be used for the synchronization process. In this regard, the selected portion of the synchronization code may be any part of the synchronization code in a particular piconet. The puncture pattern, which is utilized for puncturing, may be user specific or centrally controlled. In this regard, the puncture pattern may be programmed or dynamically updated based on various conditions. For example, the puncture pattern may be determined by exemplary conditions comprising piconet connection QoS attributes, a Bluetooth mode, and knowledge of the time of arrival of a receiving packet like timing boundaries, isochronous packets, etc. During a Bluetooth synchronization process, a receiver may scan only the selected portion of the synchronization code received. In instances where the selected portion of the synchronization code may not be found in the received synchronization code, the synchronization process may be aborted and the rest of the packet may not be processed. In instances where the selected portion of the synchronization code may be found in the received synchronization code, the system may continue as normal. In this regard, the synchronization process may be conditioned on the presence of an expected portion of a synchronization code of a particular piconet. In an exemplary conditional synchronization process, a Bluetooth enabled device may wake up minimum parts of the radio to perform a quick scan for an expected portion of the synchronization code. In instances where the radio may discover the expected portion of the synchronization code, the Bluetooth enabled device may wake up normal level radio parts to perform normal system activities. Otherwise the radio may remain asleep to reduce Bluetooth's total power consumption.

Figure 1:
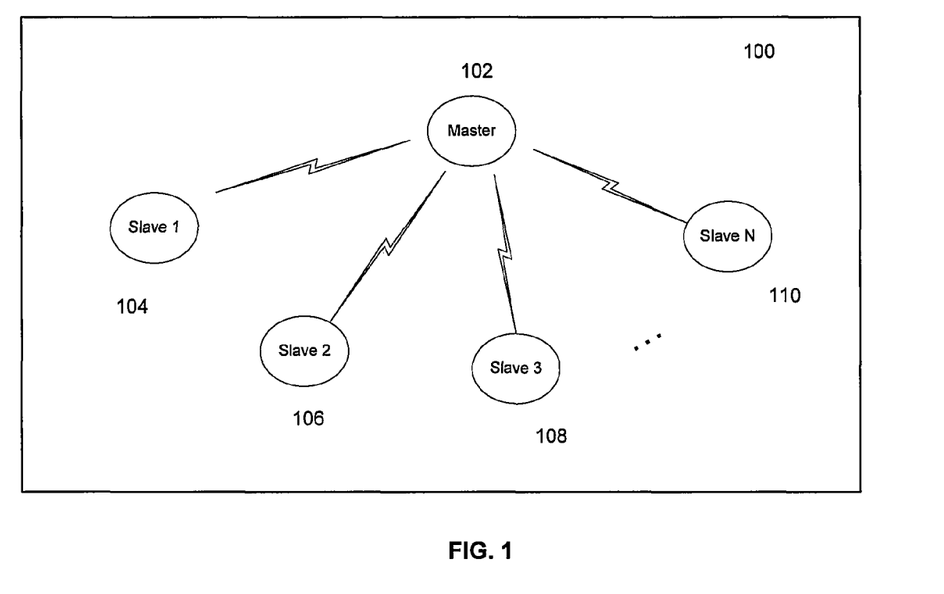
FIG. 1 is a block diagram that illustrates an exemplary Bluetooth piconet which may be utilized for Bluetooth conditional synchronization, in accordance with an embodiment of the invention.

FIG. 1 is a block diagram that illustrates an exemplary Bluetooth piconet, which may be utilized for Bluetooth conditional synchronization, in accordance with an embodiment of the invention. Referring to FIG. 1, there is shown a master device 102, a first slave device 104, a second slave device 106, a third slave device 108, and an $N^{th}$ slave device 110. The first slave device 104, second slave device 106, third slave device 108, and the $N^{th}$ slave device 110 may be collectively referenced as slave devices 104, 106, 108, . . . , 110.

The master device 102 may comprise suitable logic, circuitry and/or code that may be Bluetooth compliant and may be enabled to operate as a master Bluetooth device. The master device 102 may be integrated and/or communicatively coupled to a host device. Exemplary host devices may be a handheld communication device or a PC. The master device 102 may initiate an exchange of data over a piconet channel, and the slave devices, 104, 106, 108, . . . , 110, may be enabled to respond to the master device 102 for the duration of the piconet connection. In accordance with the Bluetooth specification, the master 102 may simultaneous connect with up to 7 active slaves devices and 256 slaves devices operating in lower power modes per piconet. The master device 102 may control and determine aspects of activities in a piconet 100.

Each of the slave devices, 104, 106, 108, . . . , 110 may comprise suitable logic circuitry and/or code that may be Bluetooth compliant and may be enabled to operate as a slave Bluetooth device. Each of the slave devices 104, 106, 108, . . . , 110 may be integrated and/or communicatively coupled to a host device. Exemplary host devices may be a handheld communication device or a PC. The slave devices 104, 106, 108, . . . , 110, may respond to the master device for the duration of the piconet connection. In instances where a piconet may be established, the slave devices 104, 106, 108, . . . , 110 may add offsets to their native clocks to synchronize to the master. The slave devices 104, 106, 108, . . . , 110, may need to synchronize to the master in both time and frequency by following the master's hopping sequence.

In operation, during a piconet connection establishment, the Bluetooth device address and clock of the master 102 may be communicated to each of the slave devices 104, 106, 108, . . . , 110. The hopping sequence utilized for communication within the piconet may be derived based on the Bluetooth device address and clock of the master 102. Each Bluetooth packet transmitted over the piconet channel may comprise an access code representing the start of the Bluetooth packet. The access code may be derived from the Bluetooth device address of the master 102. The access code may comprise a synchronization code, which may be used for timing synchronization process. Each of the Bluetooth devices in the piconet 100 may determine the synchronization code during each piconet connection. A puncture pattern may be determined by each of the Bluetooth devices in the piconet 100 and may be utilized for selecting a portion of synchronization code. A reference synchronization signal may be generated by a recipient in the piconet 100 for puncturing the determined synchronization code. The reference synchronization code may be stored at the recipient in the piconet 100. The recipient may be a master device 102, or each of the slaves devices 104, 106, 108, . . . , 110, In instances where a signal received by a Bluetooth device in a piconet 100, for example the slave device 106, a synchronization signal in the received signal may be punctured using the determined puncture pattern. The punctured version of the received synchronization signal may be utilized at the slave 106 for receive timing synchronization. One technique used for performing receive timing synchronization may comprise calculating a plurality of across-correlations between the reference synchronization signal to the punctured version of the received synchronization signal until a point of highest correlation may be detected.

Figure 2A:
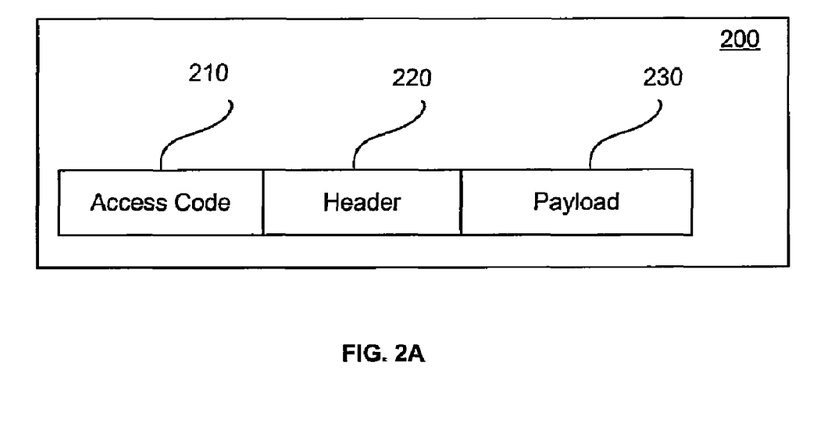
FIG. 2A is a block diagram that illustrates an exemplary Bluetooth packet format, which may be utilized in connection with an embodiment of the invention.

FIG. 2A is a block diagram that illustrates an exemplary Bluetooth packet format, which may be utilized in connection with an embodiment of the invention. Referring to FIG. 2A, there is shown Bluetooth packet 200, which may comprise an access code 210, a header 220, and a payload 230.

The access code 210 may comprise 68 bits or 72 bits in case of followed by a packet header. The access code 210 may precede each Bluetooth packet for timing synchronization process and may be used to detect the presence of the packet or address a packet to a specific device. Packets that may be exchanged over the piconet channel may be identified by the access code 210. In instances where packets may be sent in the same piconet, they may be preceded by the same channel access code.

The header 220 may comprise 54 bits containing 18 bits information encoded with a rate 1/3 repetition code. The header 220 may comprise control information associated with the Bluetooth packet and Bluetooth link, such as a Bluetooth address of an intended Bluetooth slave device. Some Bluetooth packets such as a Bluetooth ID packet used during pre-connection may not comprise a header.

The payload 230 may comprise a range from zero to a maximum of 2745 bits. The payload may contain user data and control information from higher layers. Some packets may not include a payload, such as NULL packet and POLL packet, etc.

In operation, when a piconet connection may be established or to be established, slave devices, 104, 106, 108, . . . , 110, may be told the Bluetooth Device Address of the master 102. The channel access code 210 may be derived from the Bluetooth Device Address. During communication, packets in the same piconet may be identified by the unique access code 210. In instances where a packet may be identified by a recipient, a header 220 may be decoded by the receiver for control information associated with the received packet and the link. The actual message in a payload 230 may be further decoded accordingly. In instances where a packet may not be identified by a recipient, the rest of the packet may not be processed. For example, in a single transmitting slot interval, a packet addressed to the slave device 106 may be sent by the master device 102 at selected hopping frequencies. In a single receiving slot interval, the receiver of the slave device 106 may check the received access code by comparing it to an expected access code stored on the slave device 106. In instances where the received access code may match the expected access code, the receiver of the slave device 106 may decode the header 210 to obtain control information to the packet and the link. The payload portion 230 may be further decoded based on the decoded control information from the header 220. In instances where the received access code may not match the expected access code, then the receiver of the slave device 106 may not identify the received packet and may stop processing the rest of the packet.

Figure 2B:
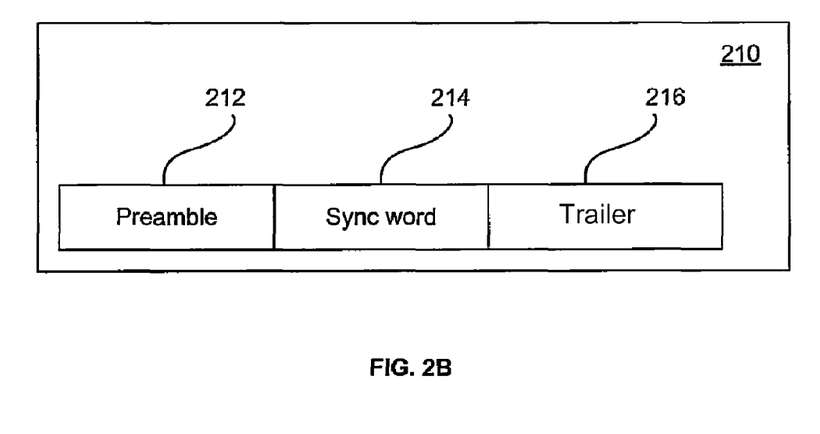
FIG. 2B is a block diagram that illustrates an exemplary format of the access code for the Bluetooth packet shown in FIG. 2A, which may be utilized in connection with an embodiment of the invention.

FIG. 2B is a block diagram that illustrates an exemplary format of the access code for the Bluetooth packet shown in FIG. 2A, which may be utilized in connection with an embodiment of the invention. Referring to FIG. 2B, there is shown an access code 210, which may comprise a preamble 212, a synchronization code 214 and an optional trailer 216.

The preamble 212 may comprise a fixed "0101" or "1010" sequence of 4 symbols depending on whether the LSB of the following synchronization code 214 may be "0" or "1" to facilitate dc compensation.

The Bluetooth synchronization code 214 may comprise a 64-bit code derived from a Bluetooth device address in a manner which may ensure large Hamming distance between different synchronization codes. This may provide good autocorrelation properties of the synchronization code to assist the receive timing synchronization process.

In instances where the header 220 may follow in the packet 200, the synchronization code 214 may be followed by a 4-bit trailer 216, which may have a value of 1010 or 0101. The value of the trailer 216 may depend on whether the most significant bit (MSB) of the synchronization code 214 may be 0 or 1, in order to provide for extended dc compensation. In instances where there may be no header 220 following in the packet 200, the access code 210 may not have a trailer 216.

In operation, to monitor whether the remote device transmitted a packet or not, a Bluetooth receiver may demodulate and recognize the 4-bit preamble 212 and the optional 4-bit trailer 216 for dc compensation, and also the 64-bit synchronization code 214 for receive timing synchronization. In accordance with various embodiments of the invention, a portion of the synchronization code 214, for example 20-30 bits out of 64-bit total synchronization code 214 may be recognized and utilized for recovering Bluetooth device receive timing. In this regard, only the Bluetooth receiver may scan a determined or predetermined portion of the synchronization code 214 during timing synchronization. In instances where a selected portion of the synchronization code 214 may not be found in the received packet 200, processing of the rest of the packet may be aborted. In instances where the selected portion of the synchronization code 214 may be found in the received packet, the system may continue its receiving process as normal. Since only a portion of the synchronization code 214 may be utilized for timing synchronization, the present invention may not require a large amount of memory for processing a received packet and synchronization may occur more rapidly.

Since the Bluetooth synchronization process may be conditioned on the presence of an expected portion of a synchronization code 214 of a particular piconet, a Bluetooth enabled device may wake up the minimum parts of the Bluetooth radio to perform a quick scan for an expected portion of the synchronization code 214. In instances where the Bluetooth radio may identify the expected portion of the synchronization code 214 it may wake up normal level radio parts to perform normal system activities. Otherwise the Bluetooth radio may remain asleep to reduce Bluetooth's total power consumption. This reduced power consumption may be particular useful in, for example, portable, battery-powered Bluetooth devices.

Figure 3:
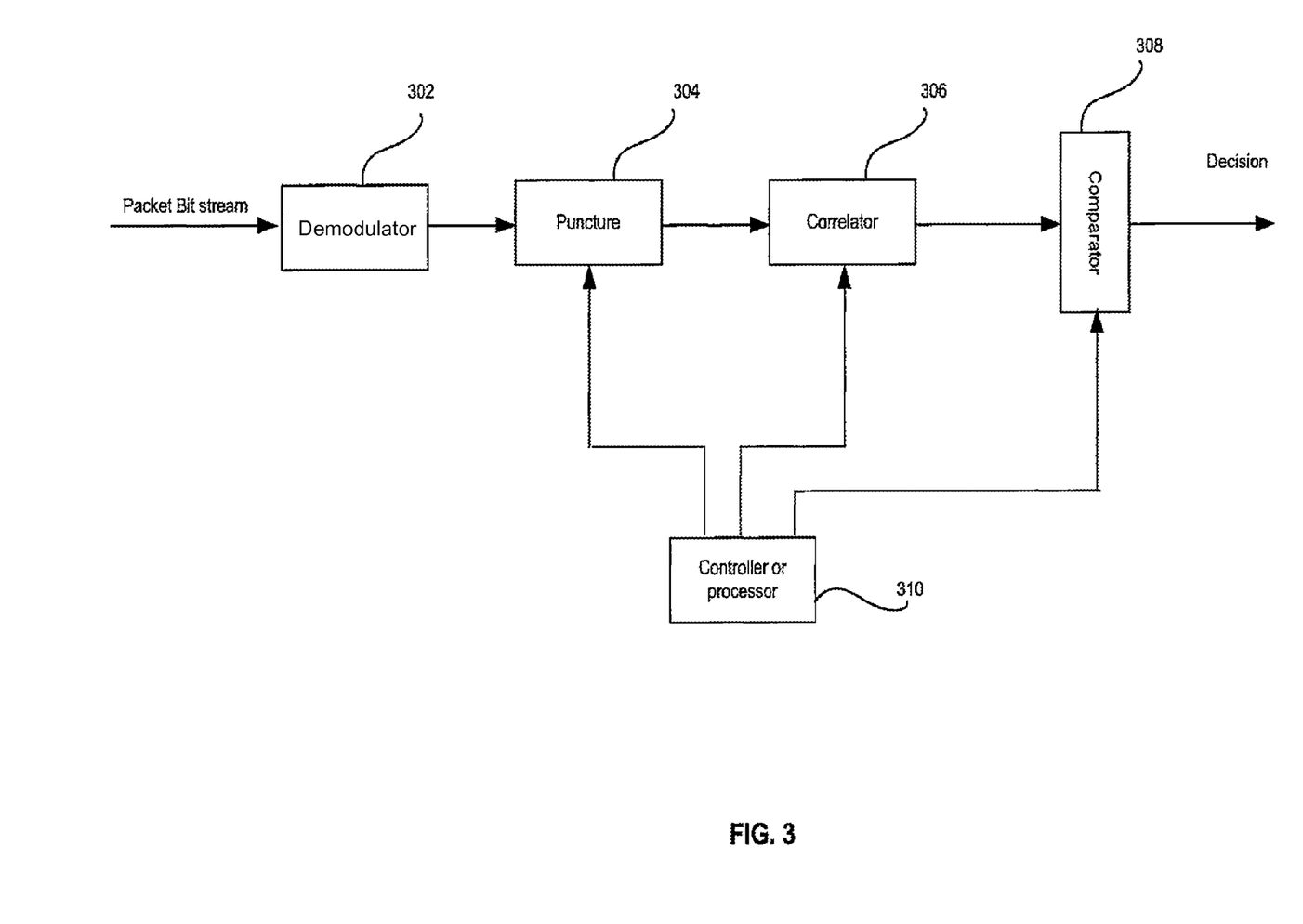
FIG. 3 is a block diagram that illustrates an exemplary receiver for Bluetooth conditional synchronization, in accordance with an embodiment of the invention.

FIG. 3 is a block diagram that illustrates an exemplary receiver for Bluetooth conditional synchronization, in accordance with an embodiment of the invention. Referring to FIG. 3, there is shown a demodulator 302, a puncture block 304, a correlator 306, a comparator 308, and a controller or processor 310.

The demodulator 302 may comprise suitable logic circuitry and/or code that may be enabled to translate a 2.4 GHz RF signal to a baseband signal. The demodulator 302 may be utilized to demodulate a received analog synchronization signal at 2.4 GHz and accordingly generate a corresponding baseband signal. The output from demodulator may be either in the form of hard bits or soft bits.

The puncture block 304 may comprise suitable logic circuitry and/or code that may be enabled to selectively sample a signal. The puncture block 304 may be used to selectively remove some of the received synchronization symbols before processing corresponding packet header and payload. A pair of binary strings called a "puncture pattern" may be used to make the selection of punctured symbols. A "1" in the pattern means the corresponding symbol may be kept in the output stream, while a "0" means the symbol in that position may have to be removed.

The correlator 306 may comprise suitable logic circuitry and/or code that may be enabled to generate a correlation metrics of two signals. The correlator 306 may calculate a plurality of across-correlations between a known code pattern and the received signal until a point of highest or lowest correlation may detected.

The controller or processor 310 may comprise suitable logic circuitry and/or code that may be enabled to set a signal correlation acceptance level and determine a signal sample pattern. A controller or processor 310 may be used to generate a puncture pattern and a correlation threshold based on several conditions, such as the structure of the predetermined synchronization code, piconet QoS attributes Bluetooth mode, etc. The controller or processor 310 may generate a reference synchronization sequence by selectively sampling the piconet synchronization code based on the selected puncture pattern. The controller or processor 310 may support user programmable puncture patterns and dynamic puncturing mode, in which puncture patterns may be varied during a piconet connection. The threshold value and samples of the selected reference synchronization sequence and corresponding puncture patterns may be stored at the controller or processor 310.

The comparator 308 may comprise suitable logic, circuitry and/or code that may be enabled to compare two elements for a decision making. A correlation value of a punctured received synchronization sequence and a reference synchronization sequence may be compared to a threshold value at the comparator 308.

In operation, a Bluetooth enabled device, for example, a slave device 106, may receive an RF signal (or any other type of signal) including a synchronization signal. To obtain the user data and control information from higher layers in the received signal, the slave device 106 may need to perform a timing synchronization process by utilizing only a portion of the received synchronization signal. The receiver of the slave device 106 may first extract the synchronization signal from the received signal and pass to the demodulator 302. The portion of the received synchronization signal may be demodulated at the demodulator unit 302 and downconverted to a baseband signal. The puncture block 304 may perform puncturing on the demodulated portion of the received synchronization signal based on a pre-determined puncturing pattern provided by the controller or processor 310 and the punctured portion of the synchronization signal may be passed to the correlator 306.

The correlator 306 may correlate the punctured synchronization sequence to a pre-determined reference synchronization sequence provided by the controller or processor 310. Depending on desired performance, the correlator 306 may calculate multiple partial correlations to cover a desired timing uncertainty. The output of the correlator 306, which may be the correlation values, may be compared to a threshold value in the comparator 308. The threshold value may be provided by the controller or processor 310. In instances where a threshold value may be exceeded, a signal such as a trigger signal may be used to determine the receive timing and to indicate a success of the synchronization process, and system may continue as normal. In instances where the threshold value may not be exceeded, an alert may be issued to indicate a failure of the synchronization process and the processing of the rest received packet bit stream may stop and the synchronization process may be aborted.

Figure 4:
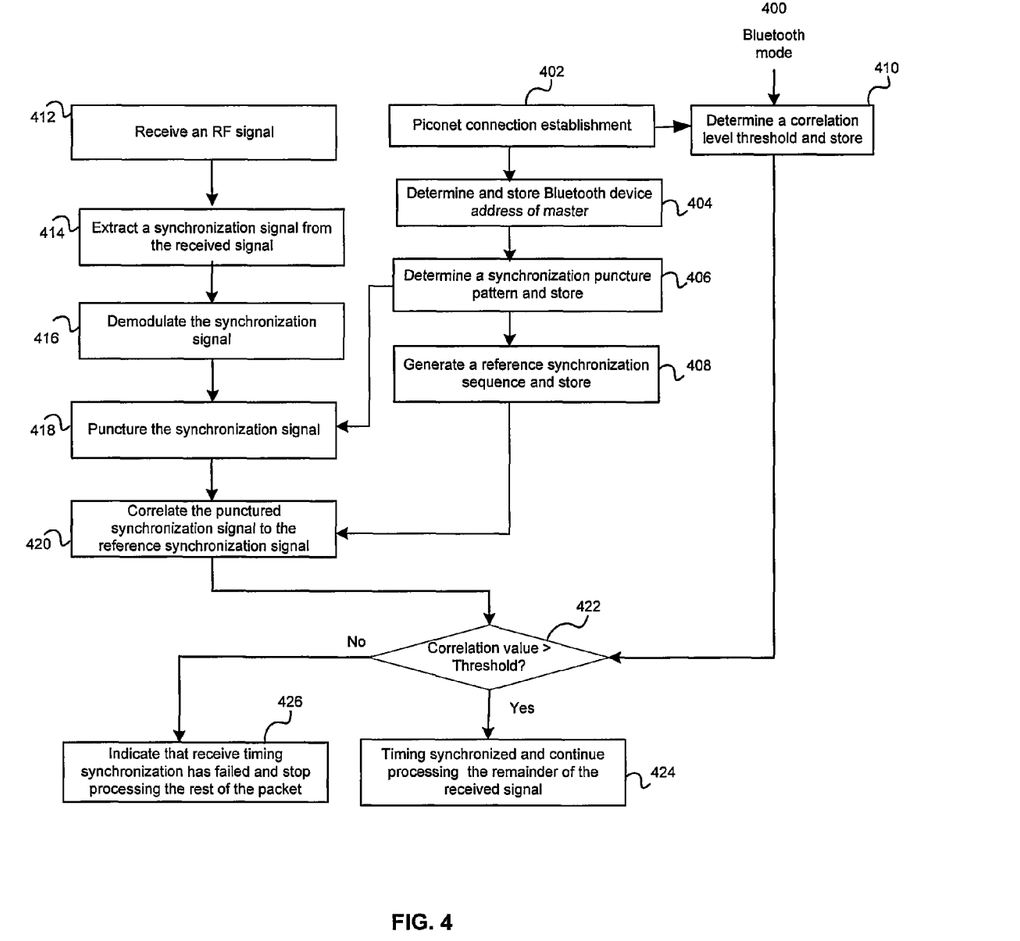
FIG. 4 is a flow chart that illustrates exemplary steps for Bluetooth conditional synchronization, in accordance with an embodiment of the invention.

FIG. 4 is a flow chart that illustrates exemplary steps for Bluetooth conditional synchronization, in accordance with an embodiment of the invention. Referring to FIG. 4, the exemplary steps begin in step 402, where a piconet connection may be established. In a piconet, when the slave devices, 104, 106, 108, ..., 110 connect to the master device 102, they may be notified of the Bluetooth device address of the master device 102. In step 404, the slave devices, 104, 106, 108, ..., 110 may extract the Bluetooth device address of the master 102 from a received Frequency Hop Synchronization (FHS) packet, which may be a control packet revealing among other things, the Bluetooth device address of the master 102. Each of the slave devices, 104, 106, 108, ..., 110 may store the extracted Bluetooth device address. In step 406, a synchronization puncture pattern may be determined and stored at the Bluetooth devices 102, 104, 106, 108, ..., 110.

The selection of the puncture pattern to selectively sample a synchronization code may be determined based on various exemplary conditions comprising the structure of the synchronization code, QoS attributes associated with the piconet connection, Bluetooth mode, and knowledge of the time of arrival of a receiving packet like timing boundaries, isochronous packets, etc. The receiver of, for example, the Bluetooth devices 102, may turned on and off in a prescribed duty cycle, which may be indicated in the selected punctured pattern, looking for a portion of the synchronization word and apply the synchronization correlation process only to the portion of the synchronization word as indexed in the puncture pattern to cover time uncertainty and probability of false packet reception. The puncture pattern may be user specific and may be programmed or dynamically updated. In step 408, at the Bluetooth devices 102, 104, 106, 108, ..., 110, a synchronization code may be derived from the Bluetooth device address of the master 102, and a reference synchronization signal may be generated by selectively sampling the synchronization code using the puncture pattern determined in step 406 and store the reference synchronization code.

In step 410, a correlation level threshold may be determined and stored at the device, 102, 104, 106, 108, ..., 110. The correlation level threshold may be selected so as to provide an acceptable signal correlation level for successful timing synchronization. The correlation level threshold may be determined based on various exemplary conditions such as the structure of the synchronization code, QoS attributes associated with the piconet connection, a Bluetooth mode, and knowledge of the time of arrival of a receiving packet. The correlation level threshold may be user specific and may be programmed or dynamically updated. In step 412, an RF signal or any other form signal may be received by a Bluetooth device, for example, the slave device 106. The received signal may be headed by a synchronization signal. In step 414, the synchronization signal may be extracted from the received signal at the slave device 106. In step 416, the received synchronization signal may be demodulated accordingly at the slave device 106. In step 418, the demodulated synchronization signal may be punctured using the puncture pattern, which was determined in step 406 for the slave device 106. A "1" in the pattern may corresponding to a symbol in that position may be kept in the output stream, while a "0" may corresponding to a symbol in that position may have to be removed. In step 420, the punctured synchronization signal may be correlated to the reference synchronization signal generated in step 408 by calculating plurality of correlation values of the two signals. The calculation of a correlation value may comprise performing multiplication or Exclusive OR (XOR) operations to indicate a match level of the two correlated signal. In step 422, the correlation value calculated in step 420 may be compared to the threshold determined in step 410. In instances where the correlation value may be greater than the threshold value, then in step 424, timing synchronization has occurred and processing of the remainder of the received signal may occur. In instances where the correlation value is less than the threshold value, then in step 426, an indication such as a trigger signal may be used to indicate that the receive timing has failed and processing of the remainder of the received packet is stopped.

Aspects of a method and system for Bluetooth conditional synchronization are provided. Each Bluetooth packet transmitted in a piconet may comprise a synchronization code. In accordance with various embodiments of the invention, only a portion of the synchronization code received at the recipient device, for example the receiver of the slave device 106, may be used for the synchronization process. The portion of the received synchronization code may be generated by selectively sampling the received synchronization code at the slave device 106. In this regard, the receiver of the slave device 106 may determine a puncturing pattern to detect specific samples in the received synchronization code. In this regard, the selection of the puncture pattern may be user specific or centrally controlled, and it may be programmed or updated dynamically. The puncture pattern may be controlled as a function of Bluetooth device QoS parameter, for example, packet error rate, or the Bluetooth Mode, for example, active mode or park mode, or knowledge of the time of arrival of a receiving packet such as timing boundaries.

In each synchronization process, the punctured version of the received synchronization code may need to synchronize to a reference synchronization code. In this regard, the reference synchronization code may be predetermined based on the Bluetooth device address of the master device 102. The reference code may be generated by puncturing a predetermined synchronization code with said puncture pattern and stored at the slave device 106. The punctured version of the received synchronization code may be compared to the reference code at correlator 306 in the receiver of the slave device 106 to indicate a match level of the two sets of codes. In this regard, comparing the two sets of codes at the correlator 306 may comprise calculating a correlation value by performing multiplication or Exclusive OR operations. There may be an inverse relation between the two operations for indicating the match level of the two sets of codes: a high degree of correlation may correspond to a lower correlation value with XOR operation and a high correlation value with multiplication. The correlation value from the correlator unit 306 may be compared to a threshold value in a comparator 308 of the receiver of the slave device 106. In this regard, the receiver of the slave device 106 may determine the threshold value to indicate an acceptable code match level between the portion of the received synchronization code and the reference code to be used for synchronization process. In this regard, the selection of the threshold value may be user specific or centrally controlled, and it may be programmed or updated dynamically. The threshold value may be controlled as a function of Bluetooth device QoS parameter, for example, packet error rate, or the Bluetooth Mode, for example, active mode or park mode. Although a Bluetooth signal is utilized, the invention may not be so limited. Accordingly, conditional synchronization of other signals such as signals from WiMAX, Wi-Fi, Wibree, Zigbee, and DECT etc. may be applied. It may be understood by those skilled in the art that various changes may be made and equivalents may be substituted without departing from the scope of the present invention.

Another embodiment of the invention may provide a machine-readable storage, having stored thereon, a computer program having at least one code section executable by a machine, thereby causing the machine to perform the steps as described herein for.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for wireless communication, the method comprising:
    receiving a portion of a signal from a device, said portion of said signal comprising a portion of a synchronization code;
    determining a puncturing pattern and puncturing said portion of said synchronization code according to said puncturing pattern to generate a punctured portion of said synchronization code;
    selectively sampling a predetermined synchronization code according to said puncturing pattern to generate a punctured reference sequence; and
    performing a partial correlation between said punctured reference sequence and said punctured portion of said synchronization code.

2. The method according to claim 1, wherein said signal is a Bluetooth signal.

3. The method according to claim 1, comprising deriving said synchronization code based on a device address of a master device in a piconet.

4. The method according to claim 1, wherein performing a partial correlation comprises performing a number of partial correlations according to a desired timing certainty, each partial correlation comprising calculating a correlation value.

5. The method according to claim 4, comprising comparing each correlation value with a threshold value.

6. The method according to claim 5, comprising processing a remaining portion of said signal based on at least one of said partial correlations.

7. The method according to claim 5, comprising dynamically controlling said threshold value.

8. The method according to claim 7, comprising dynamically controlling said threshold value as a function of at least one of a structure of said synchronization code, a communications mode, or a quality of service (QoS).

9. The method according to claim 1, comprising dynamically determining said puncturing pattern.

10. The method according to claim 1, comprising dynamically determining said puncturing pattern as a function of a communications mode.

11. The method according to claim 1, comprising dynamically determining said puncturing pattern as a function of a quality of service (QoS) attribute of a network connection.

12. The method according to claim 1, comprising dynamically determining said puncturing pattern as a function of a timing of arrival of a receiving packet.

13. A system for wireless communication, the system comprising:
    one or more circuits configured to:
        receive a portion of a signal from a device, said portion of said signal comprising a portion of a synchronization code;
        determine a puncturing pattern and puncture said portion of said synchronization code according to said puncturing pattern to generate a punctured portion of said synchronization code;
        selectively sample a predetermined synchronization code according to said puncturing pattern to generate a punctured reference sequence; and
        perform a partial correlation between said punctured reference sequence and said punctured portion of said synchronization code.

14. The system according to claim 13, wherein said signal is a Bluetooth signal.

15. The system according to claim 13, wherein said one or more circuits derive said synchronization code based on a device address of a master device in a piconet.

16. The system according to claim 13, wherein said one or more circuits perform a number of partial correlations according to a desired timing certainty, and each partial correlation calculates a correlation value.

17. The system according to claim 16, wherein said one or more circuits compare each correlation value with a threshold value.

18. The system according to claim 17, wherein said one or more circuits process a remaining portion of said signal based on at least one of said partial correlations.

19. The system according to claim 13, wherein said one or more circuits dynamically control a threshold value.

20. The system according to claim 19, wherein said one or more circuits dynamically control said threshold value as a function of at least one of a structure of said synchronization code, a communications mode, or a quality of service (QoS).

21. The system according to claim 13, wherein said one or more circuits dynamically determine said puncturing pattern.

22. The system according to claim 13, wherein said one or more circuits dynamically determine said puncturing pattern as a function of a communications mode.

23. The system according to claim 13, wherein said one or more circuits dynamically determine said puncturing pattern as a function of a quality of service (QOS) attribute of a network connection.

24. The system according to claim 13, wherein said one or more circuits dynamically determine said puncturing pattern as a function of a timing of arrival of a receiving packet.

25. A receiver for wireless communication, the receiver comprising:

- a demodulator configured to demodulate a portion of a signal, said portion of said signal comprising a portion of a synchronization code;
- a controller configured to determine a puncturing pattern;
- a puncture circuit coupled to said controller and configured to:
  - puncture said portion of said synchronization code based on said puncturing pattern to generate a punctured portion of said synchronization code; and
  - selectively sample a predetermined synchronization code according to said puncturing pattern to generate a punctured reference sequence;
- a correlator circuit configured to perform a partial correlation between said punctured reference sequence and said punctured portion of said synchronization code and provide one or more correlation values; and
- a comparator circuit configured to determine a synchronization between said signal and said reference sequence based on a comparison of said one or more correlation values and a threshold.

26. The receiver for wireless communication according to claim 25, wherein said correlator circuit is further configured to perform a number of partial correlations according to a desired timing certainty.

* * * * *